United States Patent [19]
Frazier et al.

[11] Patent Number: 5,193,008
[45] Date of Patent: Mar. 9, 1993

[54] INTERLEAVING VERTICAL PIXELS IN RASTER-BASED LASER PRINTERS

[75] Inventors: Allen L. Frazier, Derby; James S. Pierson, Augusta, both of Kans.

[73] Assignee: DP-Tek, Inc., Wichita, Kans.

[21] Appl. No.: 610,094

[22] Filed: Nov. 7, 1990

[51] Int. Cl.$^5$ ............................................. H04N 1/21
[52] U.S. Cl. ..................................... 358/298; 346/108
[58] Field of Search ................ 346/108; 358/296, 298, 358/300, 302

[56] References Cited
U.S. PATENT DOCUMENTS

| | | | |
|---|---|---|---|
| 4,437,122 | 3/1984 | Walsh et al. | 358/166 |
| 4,460,909 | 7/1984 | Bassetti et al. | 346/160 |
| 4,544,264 | 10/1985 | Bassetti et al. | 358/300 X |
| 4,625,222 | 11/1986 | Bassetti et al. | 346/160 |
| 4,742,363 | 5/1988 | Shiraishi | 346/108 |
| 4,847,641 | 7/1989 | Tung | 346/154 |
| 4,864,326 | 9/1989 | Kawammura et al. | 346/108 |
| 4,873,537 | 10/1989 | Ohta | 346/108 |
| 4,879,605 | 11/1989 | Warkentin et al. | 358/296 |
| 4,933,689 | 6/1990 | Yoknis | 346/160 X |
| 5,006,704 | 4/1991 | Mochizuki et al. | 346/108 X |
| 5,017,944 | 5/1991 | Kitamura et al. | 346/108 |

Primary Examiner—A. T. Grimley
Assistant Examiner—Nestor R. Ramirez
Attorney, Agent, or Firm—Poms, Smith, Lande & Rose

[57] ABSTRACT

The output of a conventional laser printer having a resolution of 300×300 dots per inch (DPI), and a predetermined threshold level for forming image dots, is enhanced by selectively providing interleaved image dots between the normal scan lines of the laser printer. Such interleaved image dots between scan lines may be achieved by appropriately energizing the two pixels directly above and directly below that desired interleaved dot, with the energizations at one or both pixels being selectively below the threshold level for producing a dot on the scan line, but with the combined energization at the desired interleaved point being above the threshold level to produce the desired interleaved dot. An input 600×600 bit map may be stored in a random access memory, and three vertically aligned bits from one main scan lne and adjacent 600 DPI lines above and below are drawn from the RAM and are supplied to a logic and video output circuit which produces variable pulse width modulated pulses to the laser printer to produce the enhanced image.

22 Claims, 6 Drawing Sheets

FIG. 1
PRIOR ART
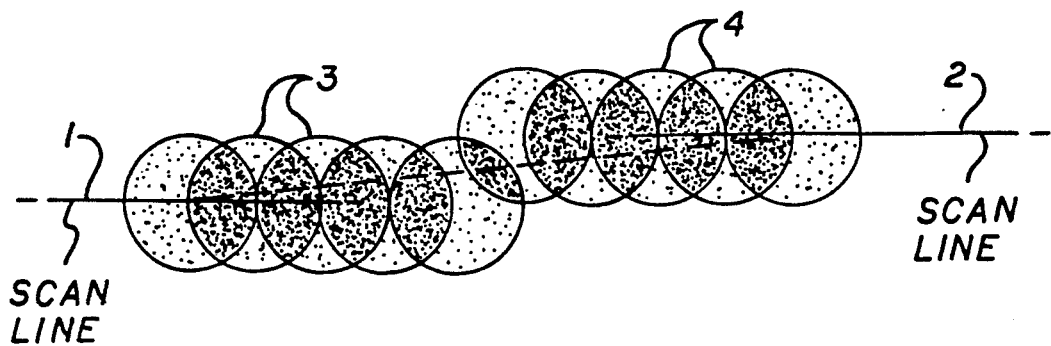
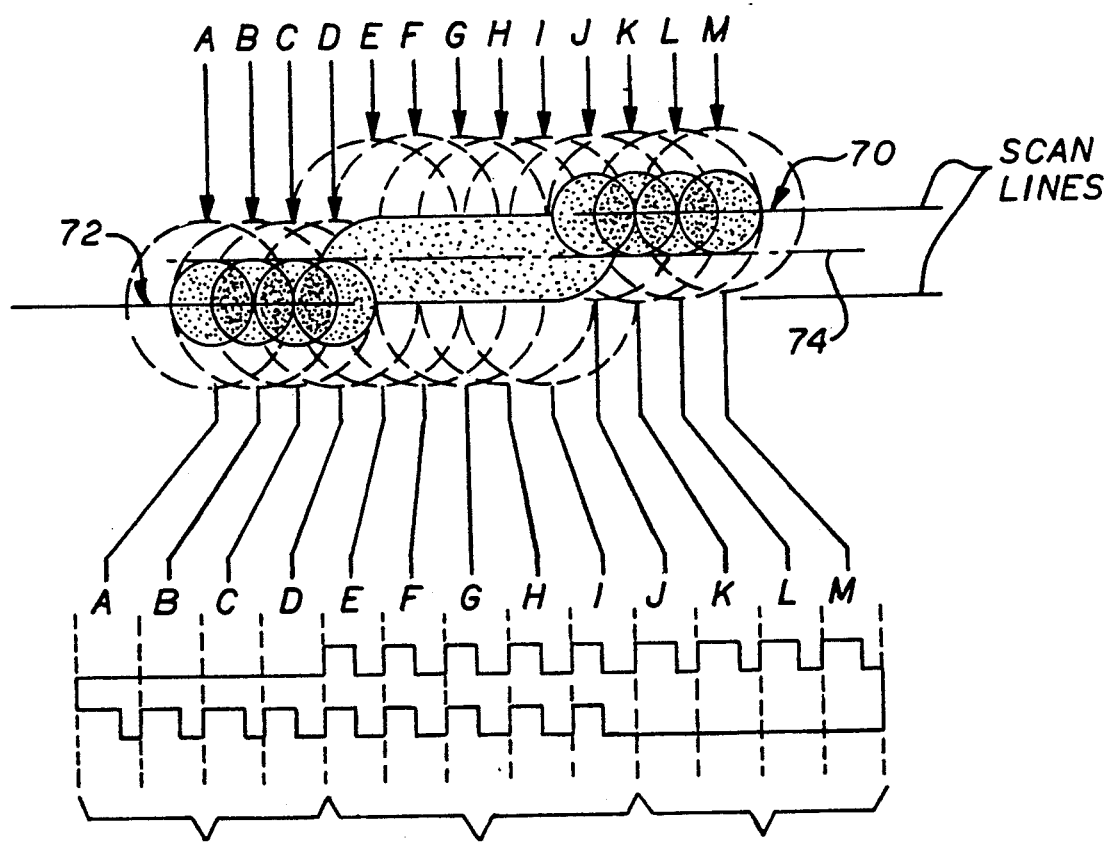
FIG. 6

INTERLEAVING VERTICAL PIXELS IN RASTER-BASED LASER PRINTERS

RELATED PATENT APPLICATIONS

This invention is related to that disclosed in U.S. patent application Ser. No. 07/610,087, filed Nov. 7, 1990, concurrently with the present case and assigned to the assignee of this case.

FIELD OF THE INVENTION

This invention relates to improving the quality of type, imaging and graphics in raster-based laser printers.

BACKGROUND OF THE INVENTION

Conventional laser printers such as those sold by Hewlett Packard and Canon, for specific examples, are designed to produce an image on paper or other print material, by placing overlapping dots at virtual positions defined by a digital raster. These virtual positions in the raster are known as "pixels", short for "picture elements". The degree of quantization of the raster is commonly referred to as the resolution; e.g., a printer having a 300 DPI (dots per inch) resolution, produces a raster of dots on 1/300 of an inch centers. Note that in this sense, "resolution" does not refer to how fine a line the printer can produce, and does not refer to the resolving of line pairs.

In laser printers, the image is first produced on a charged photoconductive material by sequentially scanning the photoconductor with a laser beam. As a line is scanned, the laser beam is energized during the extent of each pixel that corresponds to a desired dot in the image.

When the laser beam is energized, it discharges the portion of the photoconductor upon which the laser energy impinges. The sequential scanning by the laser produces a charge-pattern copy of the desired image on the photoconductor. The printed output is obtained by developing the charge pattern (attracting toner to it) and transferring the developed image to paper, or other print material.

The laser beam is only energized over the extent of a pixel; however, the resulting charge cluster that the beam produces on the photoconductor overlaps onto the pixel above, and the pixel below the pixel on the scan line. The charge cluster, which is roughly circular or oval in area, is distributed with non-linear, roughly bell-shaped intensity, which is higher at the center of the pixel. In the developing process that produces the output image, only the areas of the photoconductive material with charge above a certain threshold produce an image dot.

The image dots are made to overlap to preclude any of the background from showing through in solid multi-pixel areas, and to reduce the bead-like look of thin angled lines. To produce the overlap, the dot diameter is made to be significantly larger than one pixel; approximately two to three times as large. For example, a 300 DPI laser printer has dot diameters of approximately 1/100 to 1/150 (3/300 to 2/300) of an inch.

To obtain the virtual pixels that determine whether or not to energize the laser beam, the image to be printed is usually first rasterized; i.e., the source data, which is often analog, is quantized into non-overlapping virtual pixels. The pixel raster is also referred to at times as a bit map.

In the rasterizing process, graphic elements, such as continuous lines and character outlines are converted to pixel patterns that approximate the source shape. Continuous tone data, such as photographic data, is converted to fixed-size multi-pixel groupings that approximate the average gray value of the corresponding source data; thus, with binary pixels, a 6×6 multi-pixel grouping can simulate 36 levels of gray, and an 8×8 grouping can simulate 64 levels.

The laser printer resolution along a scan line can be easily doubled, since the laser can be turned on or off at a relatively arbitrary frequency, to produce the desired resolution. Resolution along the other axis is fixed; and determined by the interplay between the paper moving mechanism and the laser scanning speed.

Problems with Conventional Approach

In general, the fidelity of the output image to the source data is directly related to the resolution of dots in the output image. Arbitrary analog images cannot be exactly reproduced by a quantized raster; distortions result when the detail in the analog source data exceeds the sampling interval of the quantizing raster.

Distortions are most apparent, at least within the tolerance of the human eye, in continuous tone data, where the printed image appears coarse and grainy, the fine detail is blurred, and much contrast (gray tone) is lost; in text data, where the rhythm is impaired because characters can only be positioned to the nearest pixel; in character shapes, especially in character stemwidths and serifs, since character shapes can only be approximately to the nearest pixel; in lines and edges of characters, which appear jagged (unless the given edge coincides with either of the axes of the raster), since smooth edges can only be approximated with discrete pixel steps.

Existing Enhancement Methods

Various techniques have been developed to improve the quality of the output image. These enhancement techniques include: edge smoothing, fine line broadening, antialiasing (to smooth jagged edges), and increasing the resolution of the display apparatus.

Most of the enhancing techniques operate on the data after it has already been rasterized, and hence after the fine detail has already been lost, but before it is fed to the display apparatus. These enhancing techniques typically modify the signals to the display apparatus to produce smaller dots that are usually offset from the pixel center, or to produce gray dots.

Print enhancement techniques, such as in U.S. Pat. Nos. 4,437,122 issued to Walsh et al.; 4,847,641 issued to Tung and in 4,933,689 issued to Yonkis, produce useful edge smoothing, but they also smooth edges that were meant to be jagged, and can produce aberrant results.

The line smoothing techniques, such as in U.S. Pat. Nos. 4,625,222 and 4,544,264 issued to Bassetti et al. produce useful smoothing for certain line types; but they lose fine edge definition for some lines.

U.S. Pat. No. 4,864,326 issued to Kawamura et al. is of interest in disclosing a system in which two laser beams are employed concurrently to enhance the output, but would clearly add significant complexity and would be unduly expensive for general commercial use.

Conventional Use of Marking Engines

Conventional laser printers rely on placing an energy cluster on the photoconductor wherever a dot is to appear on the output image.

The improvements to conventional display apparatus typically make use of three approaches to smooth edges: reducing the size of a dot to be smaller than normal; adding additional smaller-than-normal dots along certain edges; positioning a smaller-than normal dot off-center within the pixel but along the scan line (i.e. to the left or right of the pixel center, for a horizontally scanning laser). These improvements usually interpose circuitry between the digitized raster and the production of energy clusters on the photoconductor.

SUMMARY OF THE INVENTION

In accordance with an illustrative embodiment of the present invention, the output of a 300 dot per inch laser printer may be enhanced as follows. First, the material to be reproduced is rasterized at double the resolution of the printer; i.e. at 600×600 DPI. The pixel clock is increased to produce twice as many pixels (600 DPI) along scan lines; the increase in the pixel clock reduces the width of a "normal" (full width) 600 DPI pulse to the laser, and reduces the resultant dot size, as compared with a longer 300 DPI pulse. Then, along the normal (300 DPI) scan lines, the 600 DPI bit map data from the pixels above and below the scan lines, is used to determine which of several pulse widths are used to energize the laser beam at that pixel position (on the normal 300 DPI scan line); e.g. pulse widths of 0, $\frac{1}{4}$, $\frac{2}{4}$, $\frac{3}{4}$ or 1 (relative to a full-width pulse at 600 DPI), with some of the pulse widths producing energy clusters below the threshold that produces output dots.

Certain interleaved dots can be produced by judicious choice of pulse widths that take into account the characteristics of a particular laser printer family. The interleaved dots correspond to the 600 DPI bit map resolution orthogonal to the laser scanning direction; i.e. the interleaved dots are between the normal 300 DPI scan lines.

Thus, using these techniques in a conventional Hewlett Packard printer having horizontal scan lines, a single dot may be placed between two horizontal scan lines by providing a laser energization on the scan lines at the pixel locations immediately below and immediately above the desired location, but at energy levels just below the threshold necessary to produce a dot on the major scan lines, with the overlap from the sum of the two laser impulses at the intermediate point between the two scan lines being sufficient to exceed the threshold level and to produce a dot at this point.

Incidentally, as noted above, the video signals applied to the horizontal sweep are at a 600 DPI rate. In this connection, the laser beam in several commercially available laser printers traverses a normal 8 inch sweep in about 1.28 milliseconds, and provides a synchronization or sync pulse indicating the start of a new sweep every 1.8 milliseconds, allowing about one-half millisecond for retracing. With a 600 DPI raster, each pixel location may be energized for about 268 nanoseconds (nsecs) or billionths of a second.

The threshold level in some commercial systems is between 134 nsecs and 201 nsecs, with an energization for 134 nsecs, not producing a dot and an energization of 201 nsecs producing a dot. Accordingly, if you wish to place only a single dot at a pixel location between two 300 DPI horizontal scan lines, you would energize the pixels on the scan lines above and below the pixel where the dot is to appear at a below-threshold level such as 134 nsecs, and their overlap would produce a dot at the desired intermediate location, but not on the main horizontal scan lines.

It may also be noted again that the normal size of dots on a 300 DPI printer is about 1/100 or 1/150 inch, or about two or three times the size of a dot which would have a diameter of 1/300 of an inch, so that the formed images will blend together. It is also noted that the size of the area upon which the laser beam forms a pulse increases with the duration of the pulse, as the beam is somewhat more intense at the center of the beam.

Although not all possible combinations of interleaved pixels can be obtained by this method, a useful set can be produced that enhances edges, lines and halftones, and that preserves fine detail. For example, as noted above, by selecting charges (pulse widths) that are below the threshold (that produces output dots on the printer), a dot can be produced in between scan lines, even though neither the dot on the scan line above or below is produced. However, an interleaved dot will be produced by this method whenever both pixels on the scan lines above and below (the interleaved pixel) are on; in such case, the interleaved dot will be produced regardless of whether the interleaved (virtual or input data) pixel was on or off. Further, it may be noted that interleaved dots that are produced are elongated in the scan direction rather than being substantially circular.

In accordance with a broader aspect of the invention, the image of a raster based laser beam imaging system in which the imaging materials have a threshold level, is enhanced by locating predetermined interleaved output pixel dots between normal laser scan lines by energizing pixels on two adjacent normal scan lines at two pixel points directly above and below each desired interleaved pixel dot, with laser pulses which are selectively at less than normal and/or below the threshold level, so that the overlap between the two energized pixels determines whether or not an interleaved dot is produced.

Other objects, features, and advantages of the invention will become apparent from a consideration of the following detailed description and from the accompanying drawings.

BRIEF DESCRIPTION OF THE DRAWINGS

FIG. 1 is a representation of pixel dots produced by a prior art laser printer when producing a line at a small angle relative to horizontal;

FIG. 6 is a representation of pixel dots produced in accordance with the present invention, following a line similar to that of FIG. 1.

DETAILED DESCRIPTION OF THE PREFERRED EMBODIMENT

FIG. 1 is a stylized illustration of a prior art output from a laser printer presenting a resolution of 300×300 dots per inch (DPI). This corresponds to 300 nominal scan or image lines per inch with each line having 300 DPI. In FIG. 1 two scan image lines 1 and 2 are shown with the image on the two lines composed of a plurality of pixels 3 and 4 with the stippling corresponding to areas of toner attraction. This figure illustrates the problem of creating a graphic line at a slight angle relative to horizontal because a "stair-step" effect is created when the image makes a transition from one scan or image line to another.

In the operation of a laser printer, when the laser beam sweeps across an image region, that is, a pixel on the electrostatically charged drum, the charge in this region is dissipated which allows this region to pick up toner for subsequent transfer to the output paper. Even though a laser beam is used, the border around the area of influence of the laser beam is not as precisely defined as that shown in FIG. 1, but rather is reduced somewhat from the center of the beam. Furthermore, the influence of the beam on the drum varies in accordance with the impingement time on the pixel.

Figure 5:
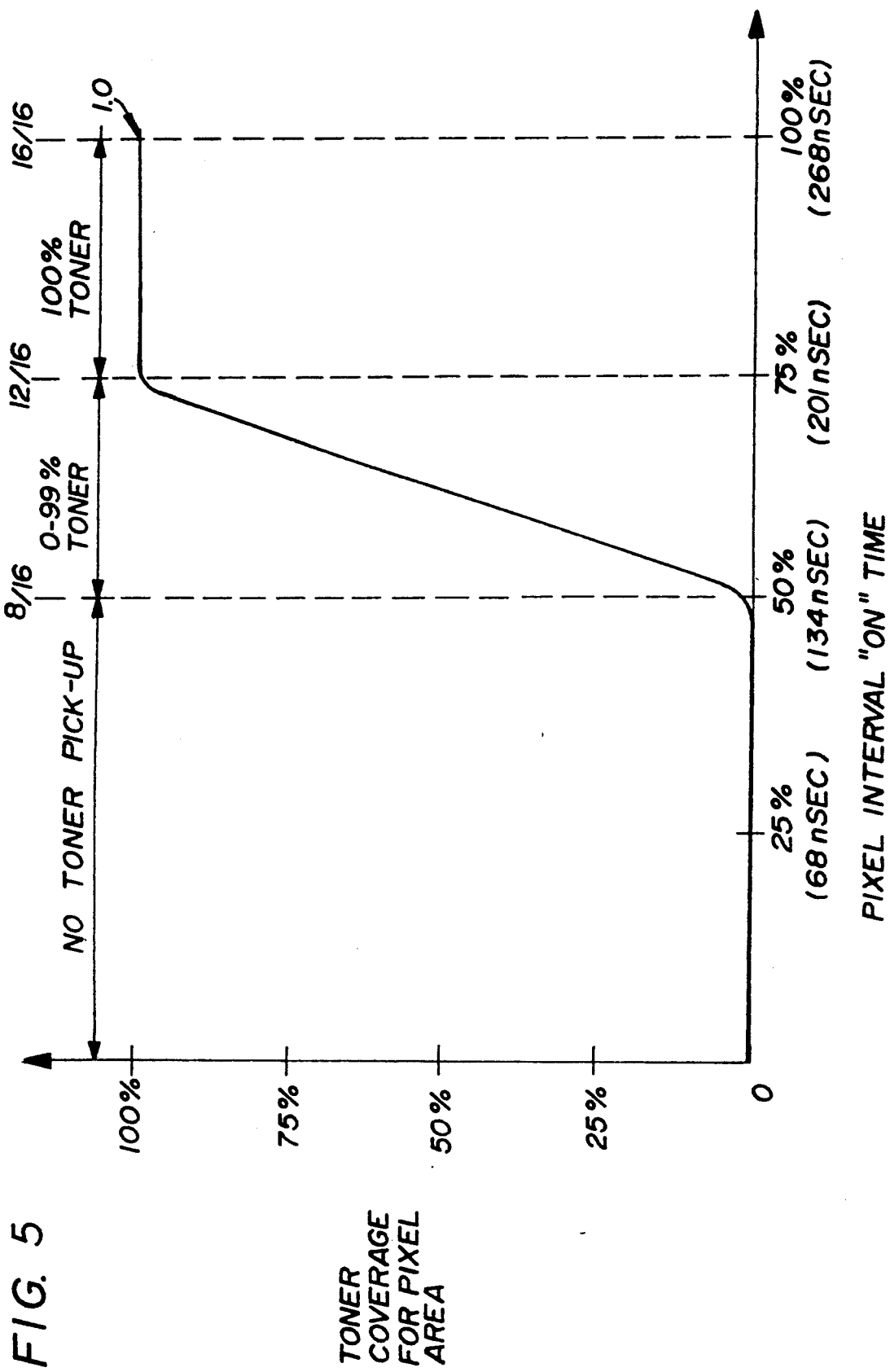
FIG. 5 is a graph of percent toner density/dot size versus laser pulse time on a pixel of a laser printer.

A graph of this variable influence effect is illustrated in FIG. 5. In a 300 DPI laser printer, the laser beam traverses a given pixel for about 536 nanoseconds (nsec). As the graph of FIG. 5 illustrates, this is more than sufficient time to ensure that the entire pixel is sufficiently discharged to allow substantial image creation in the pixel area. In addition, to further ensure that the pixel is substantially filled with toner, the size of the area of influence as the laser beam impinges on the pixel is about two or three times the pixel diameter and overlaps with adjacent areas. This is necessary to ensure continuous deposition of toner when creating a graphic line, for example.

The graph of FIG. 5 further illustrates that the area of influence of the laser beam drops rapidly as the impingement time on the pixel drops below about 400 nsec. This results in a lower percentage coverage by the toner, which is to say a smaller dot size. The present invention takes advantage of this phenomenon by varying the "on time" of impingement of the laser beam on the pixels using a pulse width modulation technique. By varying the "on" time, and by taking advantage of the overlap of areas of influence between the two proximal pixels in adjacent lines, additional interleaved dots are created between scan lines to enhance the image produced by the laser printer. This is illustrated in FIG. 6 and discussed further hereinbelow.

To briefly summarize, dots may be produced approximately half way between two horizontal scan lines by energizing the vertically aligned pixels on the corresponding two scan lines so that the sum of the energy applied to the intermediate point is above the threshold level. Thus, for example, with upper and lower pixels energized just below the threshold, the intermediate point will be energized and provide an intermediate dot, while the pixels on the horizontal scan lines immediately above and below are left without dots. With other combinations of desired output of pixel points on and between the horizontal scan lines, various levels of energization of the pixels along the scan lines are appropriate; and the required energization levels for the Hewlett Packard laser printer are included in the "Modulation Table" set forth hereinbelow.

Figure 2:
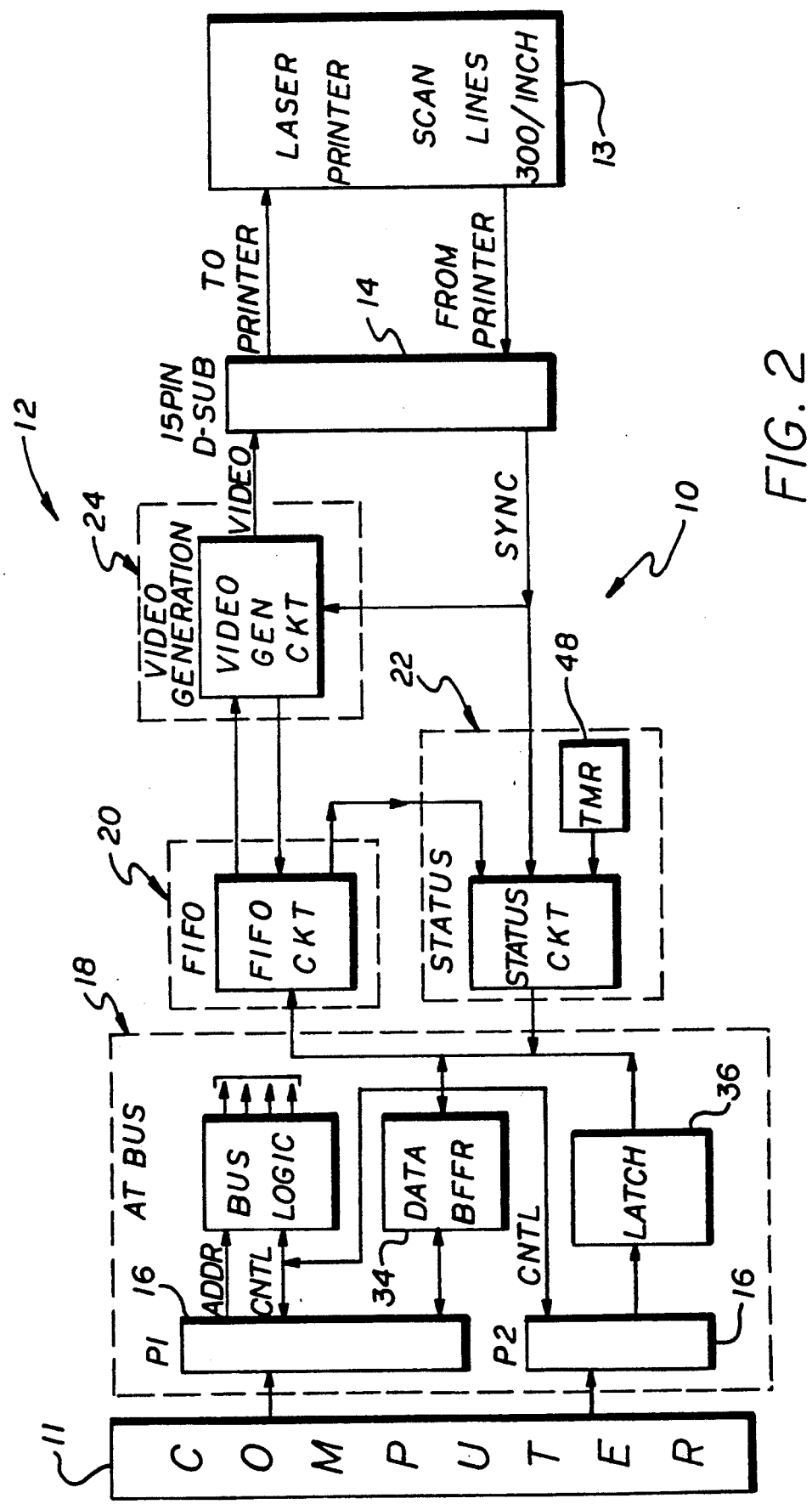
FIG. 2 is an electrical block diagram of an apparatus illustrating the principles of the invention.

FIG. 2 is an electrical block diagram of a preferred apparatus 10 for controlling a laser printer or other image creation device. Apparatus 10 is preferably interposed between a source of image data such as an IBM AT personal computer 11 and laser printer 13, such as a Hewlett Packard LaserJet. Apparatus 10 includes control circuit 12, output connector 14 for operably coupling with the printer 13 for providing modulation signals thereto, and input connector 16 for printer coupling with the PC for receiving image data therefrom.

Control circuit 12 includes PC interface circuit 18, FIFO (first in, first out) circuitry 20, which may include shift registers, status circuit 22, and video generation circuit 24. In general, address information and image data are received by interface circuit 18 which controls the flow of image data to FIFO circuit 20. Circuit 20 in turn feeds three lines of data at a time to video generation circuit 24 which creates the modulation signals for controlling energization of the laser included in the laser printer 13. Status circuit 22 ensures synchrony in the data flow between the PC 11 and the printer 13.

Figure 3:
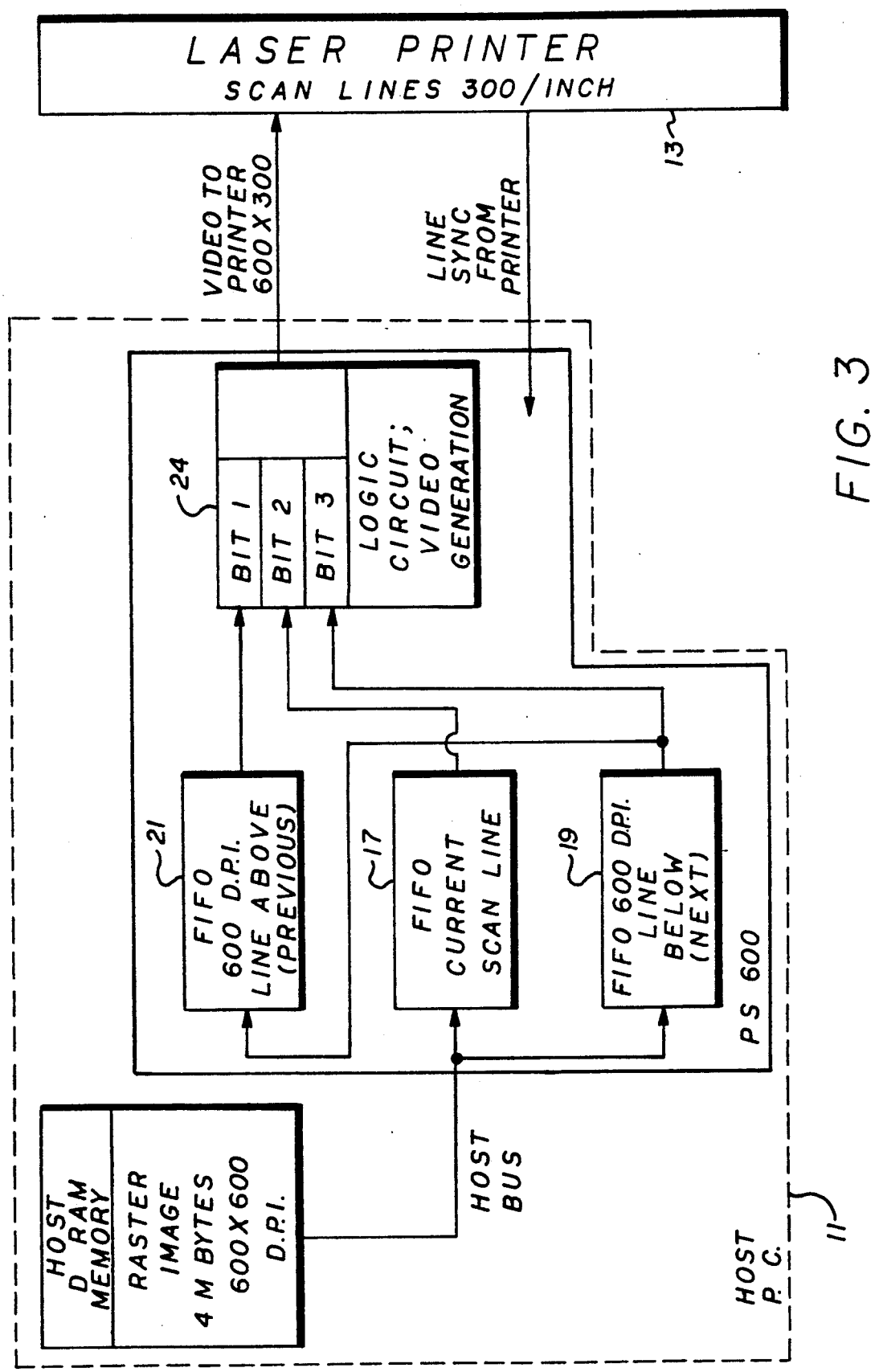
FIG. 3 is a block diagram of a portion of the system of FIG. 2 which is useful in understanding the mode of operation of the system.

FIG. 3 is a schematic functional block diagram, showing the host computer 11, which includes a random access memory (RAM) 15, having enough storage to hold a 600×600 DPI bit map of the sheet to be printed, and the laser printer 13 which may be of a conventional type having 300 horizontal scan lines per inch. The FIFO (first-in, first-out) circuits 17, 19, and 21 store lines of image bit information from the 600×600 bit map stored in random access memory 15. Specifically, the FIFO 17 stores the 600 DPI bit map information for the current scan line of the laser printer; FIFO circuit 19 holds the 600 DPI bit sequence for the line below the current scan line and half way between two scan lines; and FIFO circuit 21 stores the 600 DPI bit sequence for the line above the current scan line. Note that the output from the FIFO circuit 19 is routed to the input of circuit 21, as each line between scan lines contributes to controlling the video applied to two scan lines; and the "below" or "next" bit line of data between scan lines becomes the "above" or "previous" bit line of data during the next scan interval.

The video generation circuit 24 receives the three lines of data from FIFO circuits 17, 19, and 21, and operates successively on vertical sets of three pixel bits, from the 600 by 600 bit map, with the central pixel being on one of the physical horizontal scan lines, and the other two pixels being the 600 DPI bit map pixels immediately above and below this central pixel; and these other two pixels are not on a physical horizontal scan line of the laser printer. The output from the video generation circuit will be a series of pulse width modulated pulses, having durations as indicated in the Modulation Table set forth hereinbelow, with a single pulse in a given pixel time interval (which is approximately 268 nanoseconds).

For simplicity and clarity of description, FIG. 3 shows the FIFO circuits as single blocks connected to the logic and video generation circuitry 24.

Figure 4A:
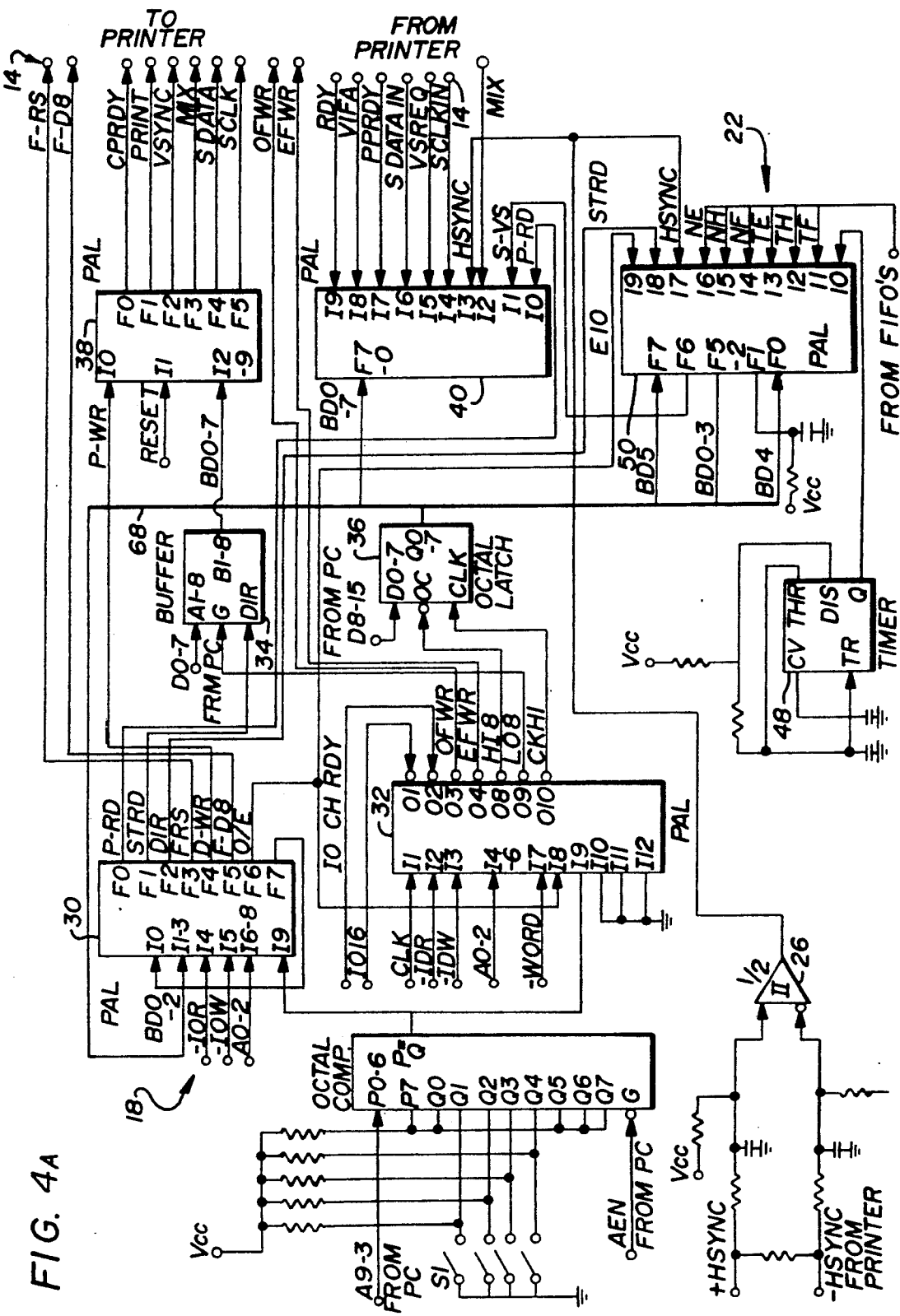
FIG. 4A and 4B together constitute an electrical schematic diagram of a portion of the apparatus of FIG. 2.
Figure 4B:
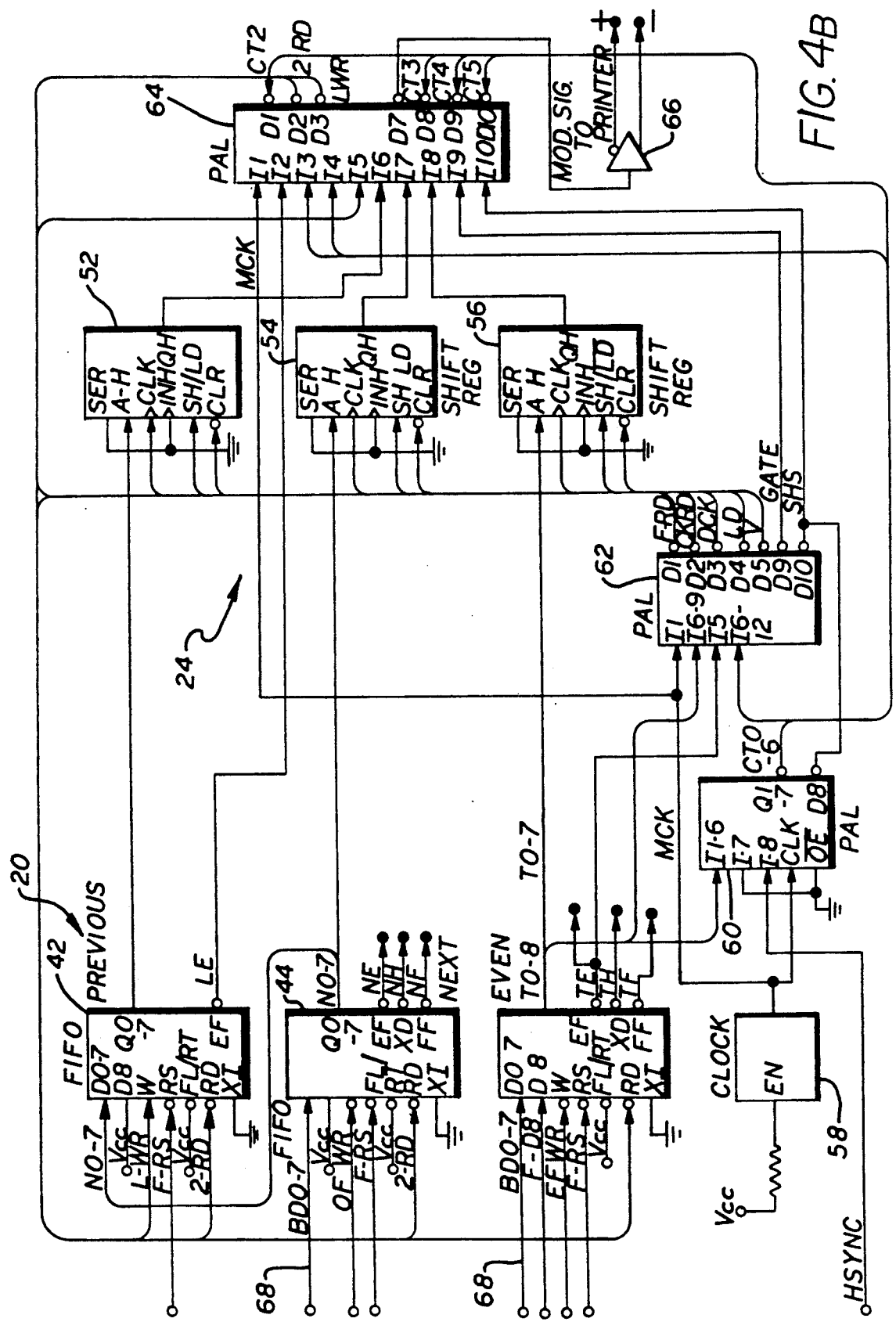

FIGS. 4A and 4B are electrical schematic diagrams of the components and interconnections of elements 14-24 of FIG. 2. In particular, interface circuit 18 shown in FIG. 4A includes input transceiver 26 (one-half of receiving and transmitting differential driver, model 75179), address selection switch S1, octal comparator 28 (74ALS688), bus controller 30 (programmable array logic 16L8), bus controller 32 (programmable array logic 22V10), bi-directional buffer 34 (74LS245), octal latch 36 (74LS373), printer data output device 38 (programmable array logic 18CV8) and printer data input device 40 (programmable array logic 16L8) all connected as shown. Switch S1 is a four unit switch used to set the base address on octal comparator 28 for comparison with the address received thereby from the PC 11 to which apparatus 10 is connected. Data output device 38 is connected to the printer by way of the lines shown for transferring commands and data therebetween. Data input device 40 is also connected to the printer by way of the lines shown for monitoring printer status.

The PC presents image data as a two-byte word composed of respective low and high bytes. Buffer 34 receives eight bits of low byte data (D0-7) from the PC at terminals A1-8 and is also used to present data over lines D0-7 to the PC for reading printer status, FIFO status, and timing signals for error detection. Latch 36 receives eight bits of high byte data (D8-15) at terminals D0-7 thereof from the PC.

FIFO (first-in, first-out) circuit 20 shown in FIG. 4B includes previous odd line FIFO 42 (MK4503), next odd line FIFO 44 (MK4503) and even line FIFO 46 (MK4503) each having the capability of storing a little over three lines of printer line data (2048, bytes). Incidentally, as used from time to time in this specification, the normal scan lines of the laser printer will be referenced as "even lines" or "nominal lines," or "physical lines," while the intermediate 600 DPI bit map lines will also be referenced as "odd lines." These FIFO circuits 42, 44 and 40 receive and store the image data from the PC corresponding to three horizontal 600 DPI image lines and serves as a data buffer for asynchronous data transfer from the PC to the printer. The FIFO circuits normally include random access memory and associated logic circuitry.

Status circuit 22 includes timer 48 (LM555C), see FIG. 4A, and FIFO status read device 50 (programmable array logic 16L8). This circuit allows the PC to monitor the empty, half-full and full status of FIFO's 44 and 46 in order to determine whether additional data is needed, and to determine whether excessive printer operation delays have occurred which may be indicative of an error condition. Video generation circuit 24 includes shift registers 52, 54, and 56 (each 74ALS166), clock 58, video timing controller 60 (programmable array logic 16R8), timing decoder 62 (programmable array logic 22V10), output modulator 64 (programmable array logic 22V10), and modular output transceiver 66 (the other half of transceiver 26, model 75179).

In operation, the base address, as set by switch S1 and received from the PC by octal comparator 28 over address lines A3-9, is used in combination with additional address bits A0-2 and input/output or I/O read (RD) and write (WR) inputs received by bus controller 30. The I/O map for these inputs from the PC. are shown as follows:

| I/O MAP | RD | WR |
|---|---|---|
| Base + 0 (B0) | FIFO reset (F RS) | Odd/even (O/E) |
| Base + 1 (B1) | Printer status (P RD) | Printer control (P WR) |
| Base + 2 (B2) | FIFO status (ST RD) | End of line (1) (F D8) |
| Base + 3 (B3) | FIFO status (ST RD) | Not end of line (0) (F D8) |
| Base + 4 (B4) | FIFO status (ST RD) | Word: low byte/ high byte (LO 8) |
| Base + 6 (B6) | FIFO status (ST RD) | Word: hi/lo byte |

The combination of high address bits from address lines A0-2 and the read/write inputs are decoded by bus controllers 30 and 32 in order to activate the output lines therefrom for controlling the other devices. Initially, an input from the PC of base+0(B0) in combination with I/O read (B0/RD) activates line F RS which resets FIFO's 44-46. Next, input B0/WR initially activates controller 30 line O/E to select even FIFO 46 for data transfer thereto.

Signal B4/WR then enables even FIFO 46 to receive data over data bus 68 from the PC by way of buffer 34 and latch 36. That is to say, the data received from the PC is 16 bit parallel data but is transferred over data bus 68 by transferring the low eight bits and then the high eight bits. Bus controller 32 controls this sequence in accordance with the inputs from the PC by activating output line L08 to buffer 34. Of the data sent to FIFO 46, the high-order two bits of the first byte of each even line of data determines whether the bit map data is in terms of 300×300 DPI, 300×600 DPI, or 600×600 DPI. Most PC's through their operating programs, allow the user to designate the type of printer which is connected for output which also designates the format for the data including the proper bit map resolution. Many commercially available word processing programs, for example, are capable of providing data bit mapped for 600×600 DPI.

The low-order six bits of the even line data's first bytes are counter data used by video timing controller 60 which is explained further hereinbelow. The next twenty bytes (approximate) are all zeroes (white data) because the typical printer does not print on the first 160-180 pixels in order to provide a left margin. Next, 600 bytes of data are transferred corresponding to eight inches of line data, assuming the 600×600 DPI mode has been selected.

During start-up, the FIFO's need to be initially filled or primed with data corresponding to three bit map lines. The data corresponds to even and odd numbered lines of bit map information. The even line data is transferred to even line FIFO 46. The odd line data corresponding to the next line of data is transmitted to odd line FIFO 44. This odd numbered line data will become the previous line of data when the next line of even numbered data is transmitted to FIFO 46. Accordingly, the odd-line data transmitted to FIFO 44 is subsequently transferred to previous line FIFO 42. Thus, after the FIFO's have initially received data on start-up, the line data therein respectively corresponds to three lines of bit map information—an even line (scan line) in FIFO 46, the next line (the bit map line below the scan line) in FIFO 44 and the previous line (the bit map line above the scan line) in FIFO 42.

In order to initially "prime" the FIFO's with data, address B2/RD allows the PC to read full/empty status of the selected FIFO to ensure that it is not full. Next, an even numbered line of data is transmitted to even FIFO 46. At the end of the line, address B2/WR sets FIFO bit D8 active indicating the end of a line. Next, address B0/WR enables odd FIFO 44 and the data transmission process is then repeated to transfer the next line of data to odd FIFO 44. This data transmission process continues to toggle between FIFO's 44 and 46 with lines of data until the FIFO's become half full. At this point, the PC checks the empty/full status of the FIFO's after each byte of data to ensure that data is not transmitted which would exceed the capacity of the respective FIFO's.

In the event of a FIFO status indication of "full," the PC waits until it reads "not full" before transmitting additional data. A horizontal sync signal is produced by the printer at the end of each line of print and is received therefrom by input transceiver 26 which buffers the signal and transfers it to devices 50 and 40 and also to video timing controller 60. The reading of data from the FIFO's is initiated by the horizontal sync signal.

FIFO status read device 50 included in status circuit 22 receives the empty/full status information from FIFO's 44–46 and presents this information on data bus 68. The horizontal sync information is translated by device 50 into a vertical sync signal which is also presented to bus 68. Timer 48 functions as a "watchdog" and presents 1/10th second pulses to device 50 which are read by the PC. If the vertical sync signal is not received within ten seconds, an error condition with the printer is indicated and the PC waits until the error is corrected. This might occur if the printer runs out of paper, for example.

Video generation circuit 24 functions somewhat independently from interface circuit 18 by pulling data from FIFO's 42–46 at the same time interface circuit 18 is keeping FIFO's 44–46 supplied with data. In general video generation circuit 24 receives parallel data from FIFO's 42–46 into shift registers 52–56 respectively which convert the data into serial format. In other words, the output from FIFO's 42–46 is asynchronous with the input. This allows the PC and printer to communicate at different operating speeds. The horizontal sync signal provides the necessary coordination.

The serialized data from shift registers 52–56 are received bit by bit into modulator 64 which transforms corresponding three bits of data into pulse width modulation signals supplied to the printer by way of output transceiver 66. The sequence of operation is controlled by clock 58, controller 60, and decoder 62 in accordance with the timing information received in the first byte of each even numbered line of image data received by even FIFO 46.

After receiving the first line of data, horizontal sync activates, and the first timing control byte is read from FIFO 46. This byte establishes the format for the subsequent reading for this line of data.

Upon receipt of the first count, modulator 64 provides a read output (RD 2) to previous line FIFO 42 which activates this FIFO to transmit its data as output to shift register 52 substantially simultaneously with the data output from FIFO's 44 and 46 to shift registers 54 and 56 respectively. On start-up, the first line of data from previous line FIFO 42 is undefined because no data has been yet transferred from next FIFO 44. The first line of data is not printed by the printer, however, so the first line of ambiguous data from FIFO 42 is of no consequence. Shift registers 52–56 then convert the parallel input data to serial outputs, one bit at a time, at the respective QH output points. The QH outputs are received at terminals I6 through I8 respectively of modulator 64. Modulator 64 then converts each set of three input bits to the modulation signal provided to the printer by way of output transceiver 66.

Clock 58 also provides clock pulses to modulator 64. These clock pulses are a rate eight times that of the rate bits are received from shift registers 52–56. In other words, registers 52–56 clock out data according to the signals DCK received from decoder U8 and the DCK clock signals are one-eighth the frequency of the MCK clock signals received from clock 58. This allows modulator 64 to divide the modulated output bits into eighths, that is, to pulse-width modulate in increments of one-eighth of a pulse. Modulator 64 accomplishes the conversion according to the following:

MODULATION TABLE

| PREVIOUS (Odd) | EVEN | NEXT (Odd) | OUTPUT | |
|---|---|---|---|---|
| 0 | 0 | 0 | 0 VIDEO OFF | |
| 1 | 0 | 0 | 4/8 VIDEO PULSE | (134 nsec) |
| 0 | 1 | 0 | 6/8 VIDEO PULSE | (201 nsec) |
| 1 | 1 | 0 | 7/8 VIDEO PULSE | (234 nsec) |
| 0 | 0 | 1 | 4/8 VIDEO PULSE | (134 nsec) |
| 1 | 0 | 1 | 6/8 VIDEO PULSE | (201 nsec) |
| 0 | 1 | 1 | 7/8 VIDEO PULSE | (234 nsec) |
| 1 | 1 | 1 | 8/8 VIDEO ON | (268 nsec) |

For example, line 3 of the Modulation Table represents a situation in which the data bit for the even line pixel corresponds to a dot and the previous and next odd line data bits indicate zero representing no dot. This corresponds to pixel dots A–D and J–M of FIG. 6. In this situation, these three bits of input data received from shift registers 52–56 translate into an output pulse which is "on" for 6/8 of the pulse width corresponding to about 201 nsec. as illustrated in FIG. 5.

As further example, line 5 of the modulation table indicates an input bit pattern from shift registers 52–56 of 0, 0, and 1 corresponding to previous, even, and next lines of bit data being processed. This bit pattern translates into an output pulse which is "on" for 4/8 of the pulse width as illustrated in FIG. 6 for pixel dots E-1. This also corresponds to an "on" time of 134 nsec. as shown in the graph of FIG. 5.

The operation of apparatus 10 as described above produces modulation signals for 600×600 DPI mode. If desired, however, 300×300 and 300×600 modes can also be used as determined by the two high-order mode selection, data bits of each even numbered line of image data. If the lower DPI modes are selected, the image data is received already appropriately bit mapped for those resolutions in order to eliminate the odd numbered lines. Furthermore, for the 300×300 DPI mode, the count data provided to video timing controller 60 is interpreted such that the count outputs on lines CT0-6 are utilized at half the 600 DPI rate for controlling modulator 64. The net effect is that no modification is made to the signal for 300×300 DPI mode and the image data merely passes through apparatus 10.

FIG. 6 represents image lines created by the laser printer using the present invention and illustrates the enhancement achieved thereby as compared to the prior art of FIG. 1. The image lines shown include top scan line 70, bottom scan line 72, and intermediate line 74. Top and bottom lines 70, 72 correspond to even numbered lines and intermediate line 74 corresponds to an odd numbered line. Additionally, top and bottom lines 70, 72 correspond to the nominal image lines created by the respective raster sweeps of the printer at 300 per inch and, as a result, are separated by 1/300th of an inch. Line 74 is located in the space between scan lines 70, 72 as a result of the modulation process described above.

Top and bottom lines 70, 72 each include pixels A through M which are actuated in accordance with the pulse width modulation of the laser beam as it sweeps across each line as illustrated by the pulse width modulation graph of FIG. 6. At 600 DPI, the laser beam traverses a given pixel in about 268 nsec. (see FIG. 5) and this full modulation corresponds to "1.0" in the FIG. 5 graph. When the laser beam impinges upon a pixel, the pixel is actuated in a manner to present a central zone surrounded by an outer zone. In FIG. 6 the boundaries of the central zone of pixels A-D and J-M are represented by the solid circular lines. The boundaries of the surrounding outer zones are represented by the respective dashed lines.

In particular, and with regard to top line 70, the laser beam is modulated at zero, that is, the laser beam is off during the pass through pixels A, B, C, and D. At pixels E, F, G, H, and I, the laser beam is "on" for 4/8ths of the time (134 nsec). Pixels J through M for top line 70 are modulated at 6/8th (201 nsec). For top line 70, a modulation time of zero for pixels A-D is, of course, insufficient to allow any toner attraction. Similarly, even though pixels E-I are modulated at 4/8ths, this is still insufficient for substantial image creation at these pixels sites as illustrated. The modulation for pixels J-M at 6/8ths is sufficient, however, to allow toner attraction in the central zone. This level of modulation for pixels J-M results in a smaller dot size as compared to 300 DPI dots illustrated in FIG. 1. This is desirable because a smaller dot size is necessary for the 600 DPI mode.

The laser beam sweep is also modulated as it moves across bottom line 72. The "on-time" for pixels A-D is controlled at 6/8ths to allow creation of the image dots shown for 600 DPI mode. As with top line 70, pixels E-I of bottom line 72 are also modulated at 4/8ths and the laser beam is off during the pass through pixels J-M.

As illustrated in FIG. 6, respective pixels E-I of top and bottom lines 70, 72 overlap in respective intermediate zones. For example, the respective "E" pixels illustrated in FIG. 6 are proximal to one another by virtue of being one above the other in adjacent nominal image lines, and each is outlined by a dashed line representing the respective outer zone. The respective inner zones of the "E" pixels are insufficiently actuated at a modulation rate of 4/8ths for substantial image creation. Hence, no inner circles corresponding to the respective central zones are shown. Even though the central zones of pixels E-I are insufficiently actuated for substantial image creation, the respective intermediate zones are sufficiently actuated to allow toner attraction for creating dots on line 74. In other words, the effects of the respective laser beam impingements interact in the intermediate zones in order to sufficiently discharge these zones for toner attraction in order to create dots on line 74.

As those skilled in the art will appreciate, the present invention encompasses many variations in the preferred embodiment described herein. For example, the functions of apparatus 10 could be implemented in software, or by other hardware components providing comparable results. The hardware components, however, are preferred for simplicity, lower cost and increased speed. Additionally, the components of the present invention could be incorporated as part of a laser printer or as part of a personal computer, for example, during original equipment manufacture, although an add-on circuit board for apparatus 10 is preferred for retrofit applications. As a final example, the utility of the present invention is not limited to a laser printer but is useful for other devices in which overlapping field effects can be used to create additional dots between scan line pairs. In the present application reference has been made to horizontal scan lines, as an example; however, scanning may be accomplished vertically, and references to "horizontal" and "vertical" should be construed to cover both cases and to merely indicate mutually orthogonal directions. It will also be appreciated that the input bit map could be obtained from any available source including digital data representing text material. Accordingly, the present invention is not limited precisely to the embodiment described hereinabove, and disclosed in the drawings.

What is claimed is:

1. Apparatus for enhancing the image produced by a scanning laser beam printer, utilizing a charge pattern and toner to develop an image, said laser printer having a resolution comprised of a predetermined DPI (dots per inch) along parallel laser beam scan lines with the number of scan lines per inch corresponding to said DPI, said laser beam being normally selectively energized, at said predetermined DPI rate along said scan lines, at a predetermined dot-writing level sufficient to exceed a predetermined threshold of the imaging components, said threshold being determinative of the presence or absence of dots on the laser printer image, and said laser printer also having means for accepting an external video signal that controls the energizing of said laser beam, said apparatus comprising:

means for providing digital signals corresponding to a double DPI bit map of the desired image to be produced by said laser printer, said bit map having twice the predetermined DPI resolution of said laser printer;

temporary storage means, coupled to receive said digital signals, for temporarily storing at least portions of three lines from said double DPI bit map, with one of said lines corresponding to a normal scan line of said laser printer and the other lines being the double DPI lines immediately above and below said scan line;

means for extracting successive sets of three bits, one bit from each of said three lines at corresponding positions along said lines;

logic means for decoding said three bits into up to five different values, each of said different values associated with one of a plurality of video pulse widths, some of said pulse widths being below said threshold level of said laser printer, but are of sufficient intensity to produce an image dot between scan lines when adjacent points on successive scan lines are energized just below the imaging threshold;

means for generating scan lines of video signal at twice said predetermined DPI of said laser printer, but with the same number of scan lines as said laser printer, said video signal comprised of consecutive pulses of said pulse widths corresponding to the decoded values associated with the combinations of said three bits, and at least some of said pulse widths being below the predetermined threshold level of said laser printer;

means for coupling said video signal to energize the laser beam of said laser printer;

said apparatus including means for producing a complete image at a higher resolution than said predetermined DPI with a single pass of said laser beam; and said apparatus including means for providing a laser beam which extends more than half way between adjacent scan lines.

2. An apparatus as defined in claim 1 wherein a random access memory is provided for storing a double density bit map from which said digital signals are provided.

3. An apparatus as defined in claim 1 wherein said temporary storage means includes a plurality of random access memory FIFO circuits.

4. An apparatus as defined in claim wherein said bit extracting means includes a plurality of shift registers.

5. An apparatus as defined in claim 1 wherein said means for generating scan lines of video signal includes logic circuit means for determining the intensity of video signals at each bit position along the scan lines from three binary input signals from said bit map, including (1) the pixel signal corresponding to the current scan line, (2) the pixel signal corresponding to the line immediately above the current scan line, and (3) the pixel signal corresponding to the line immediately below the current scan line.

6. An apparatus as defined in claim 5 wherein the means for generating scan lines of video signal includes three FIFO circuits, three shift registers coupled to said FIFO circuits, and said logic circuit coupled to the output of said shift registers.

7. In a raster based laser beam imaging system having a predetermined normal DPI (dots per inch) resolution, and having a single laser beam making horizontal sweeps corresponding to said resolution, and using imaging materials having a predetermined threshold level, the improvement comprising:
   means for energizing the laser beam at a rate to provide a higher number of dots per inch in the horizontal scan direction than said predetermined DPI;
   means for selectively creating predetermined, interleaved dots located at points between the horizontal scan lines of the laser beam by energizing said laser beam at two points on said scan lines directly above and below each predetermined desired interleaved dot, with the energization at one or both of said additional points on said scan lines being selectively below said threshold level, but with the cumulative energization at the interleaved predetermined point being greater than said threshold level so that dots appear at the predetermined interleaved points;
   said apparatus including means for producing a complete image at a higher resolution than said predetermined normal DPI with a single pass of said laser beam; and
   said apparatus including means for producing a laser beam which extends more than half way between adjacent scan lines.

8. An apparatus as defined in claim 7 wherein the means for energizing the laser beam includes means for providing digital signals representing the desired image with a resolution of twice said predetermined DPI.

9. An apparatus as defined in claim 8 wherein said means for generating video signals includes logic circuit means for determining the intensity of video signals at each bit position along the horizontal scan lines from three binary input signals from said bit map, including (1) the pixel signal corresponding to the current scan line, (2) the pixel signal corresponding to the line immediately above the current scan line, and (3) the pixel signal corresponding to the line immediately below the current scan line.

10. An apparatus as defined in claim 7 wherein the means for energizing the laser beam includes three FIFO circuits, three shift registers coupled to said FIFO circuits, and a logic circuit coupled to the output of said shift registers.

11. An apparatus for use with an image creation device such as a laser printer, the device including a body presenting an actuatable surface having image regions such as pixels defined thereon, and including a single selectively operable actuating means for actuating respective image regions for image creation and in order to present, for each actuated region, an actuated central zone surrounded by an actuated outer zone, said apparatus comprising:
   control means for controlling the device actuating means in order to actuate a pair of vertically aligned image regions such that at least one of the respective central zones thereof is insufficiently actuated for substantial image creation while the respective outer zones cooperatively interact to form, between said respective central zones, an intermediate zone which is sufficiently actuated for image creation; with the energization of said actuating means being determined solely by the desired bit configuration of precisely three vertically aligned pixels;
   means for operably coupling said control means with the device actuating means;
   said apparatus including means for producing a complete image at a higher resolution than the normal resolution of said image creation device with a single pass of said actuating means; and
   said apparatus including means for providing an actuating means which extends more than half way between adjacent vertically spaced image regions.

12. The apparatus as set forth in claim 11, the image regions being actuatable by a beam of radiation such as laser light impinging thereon, the actuating means including means for selectively producing and directing a beam for impingement on and sweeping across each region during a predetermined sweep time period,
   said control means further including means for modulating the beam directed for impingement on said pair of regions such that the beam impinges thereon for a time period sufficient to form said intermediate zone and for a time period less than the sweep time period.

13. The apparatus as set forth in claim 12, the image regions being configured to present a plurality of side-by-side image lines, said control means further including means for actuating respective image regions in adjacent ones of the image lines in order to present said pair of image regions.

14. The apparatus as set forth in claim 13, said adjacent ones of the image lines presenting an intermediate space therebetween, said control means further including means for forming said intermediate zone within said intermediate space.

15. The apparatus as set forth in claim 12, said control means further including means for processing said image data such that modulation data represents beam on-time for each image region.

16. Apparatus for enhancing the image produced by a scanning laser beam printer, said laser printer having a resolution comprised of a predetermined DPI (dots per inch) including parallel laser beam scan lines with the number of scan lines per inch corresponding to said DPI, and a predetermined DPI bit rate of energizing said laser beam along said scan lines, said laser beam being normally selectively energized, at said predetermined rate along said scan lines, at a predetermined dot-writing level sufficient to exceed a predetermined threshold of the imaging components and also determinative of the size of the image dots, said threshold being determinative of the presence or absence of dots on the laser printer image, and said laser printer also having means for accepting an external video signal that controls the energizing of said laser beam, said apparatus comprising:

means for providing digital signals corresponding to a double bit map having double DPI at least in the vertical direction of the desired image to be produced by said laser printer, said bit map having twice the predetermined DPI resolution of said laser printer; at least in the vertical direction;

temporary storage means, coupled to receive said digital signals, for temporarily storing at least portions of three lines from said bit map, with one of said lines corresponding to a normal scan line of said laser printer and the other lines being the double DPI lines immediately above and below said scan line;

means for extracting successive sets of three bits, one bit from each of said three lines at corresponding positions along said lines;

logic means for decoding said three bits into up to five different values, each of said different values associated with one of a plurality of video pulse widths, some of said pulse widths being below said threshold level of said laser printer;

means for generating scan lines of video signal with the same number of scan lines as said laser printer, said video signal comprised of consecutive pulses of said pulse widths corresponding to the decoded values associated with the combinations of said three bits, and at least some of said pulse widths being below the predetermined threshold level of said laser printer;

means for coupling said video signal to energize the laser beam of said laser printer;

said apparatus including means for producing a complete image at a higher resolution than said predetermined DPI with a single pass of said laser beam;

said apparatus including means for providing a laser beam which extends more than half way between adjacent scan lines.

17. An apparatus as defined in claim 16 wherein a random access memory is provided for storing the bit map from which said digital signals are provided.

18. An apparatus as defined in claim 16 wherein said temporary storage means includes a plurality of random access memory FIFO circuits.

19. An apparatus as defined in claim 16 wherein said bit extracting means includes a plurality of shift registers.

20. An apparatus as defined in claim 16 including means for energizing said laser beam at a double DPI rate along said scan lines.

21. Apparatus for enhancing an image produced by a scanning beam marking engine, said marking engine having a nominal resolution comprised of a predetermined number of scan lines of a scanning beam of said marking engine, with each said scan line having a predetermined number of picture elements or pixels, said scanning beam normally being energized selectively at a predetermined rate along said scan lines to yield said predetermined number of pixels, said scanning beam energization being at a predetermined dot-writing level sufficient to exceed a predetermined threshold of imaging components included in said marking engine and also being determinative of a size of image dots, said threshold being determinative of a presence or absence of dots on an output image from the marking engine, said apparatus comprising:

means for producing digital signals corresponding to pixels, at a desired output resolution different from said nominal resolution, of a bit map of a desired image to be produced by said marking engine;

temporary storage means, coupled to receive said digital signals, for temporarily storing a plurality of consecutive lines of said bit map;

means for selecting a plurality of actuating signals for said marking engine, such that some of said actuating signals are below an imaging threshold of said marking engine, but are of sufficient intensity to produce an image dot between scan lines when adjacent points on successive scan lines are energized just below the imaging threshold;

means for selecting a position at which said marking engine is capable of producing an imaging signals;

means for extracting from said temporary storage means a sample subset having a predetermined number of pixels in a predetermined configuration, having said selected position in said marking engine which coincides with an approximate center of said predetermined number of pixels in a predetermined configuration, and with at least one of said pixels being spaced between scan lines of said marking engine;

logic means for decoding the predetermined configuration of pixels and selecting a corresponding one of said actuating signals for said marking engine;

means for generating actuating signals for said marking engine from the configuration of pixels;

means for generating said scan lines from said actuating signals for said marking engine;

said apparatus including means for producing a complete image at said different output revolution with a single pass of said beam; and said apparatus including means for producing a scanning beam which extends more than half way between adjacent scan lines.

22. An apparatus as defined in claim 21, wherein said desired output resolution is twice said nominal resolution.

* * * * *